US012762323B2

(12) United States Patent
Tsui et al.

(10) Patent No.: US 12,762,323 B2
(45) Date of Patent: Oct. 13, 2026

(54) ON DEMAND INTERACTIVE CONTENT GENERATION IN AUDIOBOOKS THROUGH A NATURAL LANGUAGE INTERFACE

(71) Applicant: Apple Inc., Cupertino, CA (US)

(72) Inventors: Kin Wai Tsui, Vancouver (CA); Yuchia Chang, Cupertino, CA (US); Junhan Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 264 days.

(21) Appl. No.: 18/593,372

(22) Filed: Mar. 1, 2024

(65) Prior Publication Data

US 2025/0278874 A1 Sep. 4, 2025

(51) Int. Cl.
*G06T 11/60* (2026.01)
*G06F 40/103* (2020.01)

(52) U.S. Cl.
CPC ............ *G06T 11/60* (2013.01); *G06F 40/103* (2020.01)

(58) Field of Classification Search
CPC ......... G06T 11/60; G06F 40/103; G06F 40/56
See application file for complete search history.

(56) References Cited

U.S. PATENT DOCUMENTS 9,742,753 B2 8/2017 Talley
10,225,627 B2 3/2019 Brelis et al.
11,170,038 B1 * 11/2021 Platt ...................... G06T 11/206
11,275,565 B2 3/2022 Bodin et al.
11,582,536 B2 2/2023 Packard et al.
11,853,107 B2 12/2023 Panuganty et al.
2016/0225187 A1 * 8/2016 Knipp .................. G06F 40/131
2020/0019370 A1 * 1/2020 Doggett .................. G10L 15/22
2022/0310083 A1 * 9/2022 Mohanty ................ G10L 15/22

FOREIGN PATENT DOCUMENTS

KR 10-1407964 B1 6/2014
KR 10-1818107 B1 1/2018
KR 10-2218316 B1 2/2021
KR 10-2304240 B1 9/2021

OTHER PUBLICATIONS

Ross et al., "Script for the movie 'Big'", 1998, The Internet Movie Script Database (IMSDb), retrieved from https://imsdb.com/scripts/Big.html, (41 pages total).

* cited by examiner

*Primary Examiner* — Cao H Nguyen
(74) *Attorney, Agent, or Firm* — YHE Law LLP

(57) ABSTRACT

Disclosed are systems, methods, and computer-readable media for generating interactive content of audiobooks through a natural language interface. The disclosed technology generates a system prompt based on a combination of a user prompt and personal information of the user or of the user's environment. This combination can then be input into a multimodal machine learning model or multiple unimodal machine learning models to create both text and image outputs corresponding to the requested story line. The story can then be presented to the user and edited as needed, in some embodiments using the same content generation service that produced the system prompt to begin with.

21 Claims, 10 Drawing Sheets

ON DEMAND INTERACTIVE CONTENT GENERATION IN AUDIOBOOKS THROUGH A NATURAL LANGUAGE INTERFACE

BACKGROUND

The creation of audiobooks has long been a labor-intensive process, requiring significant time and resources to produce high-quality audio content. Traditional methods involve manual narration by voice actors, which can be expensive and time-consuming. Additionally, the process of generating accompanying images to complement the audio further adds to the complexity and cost of audiobook production.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
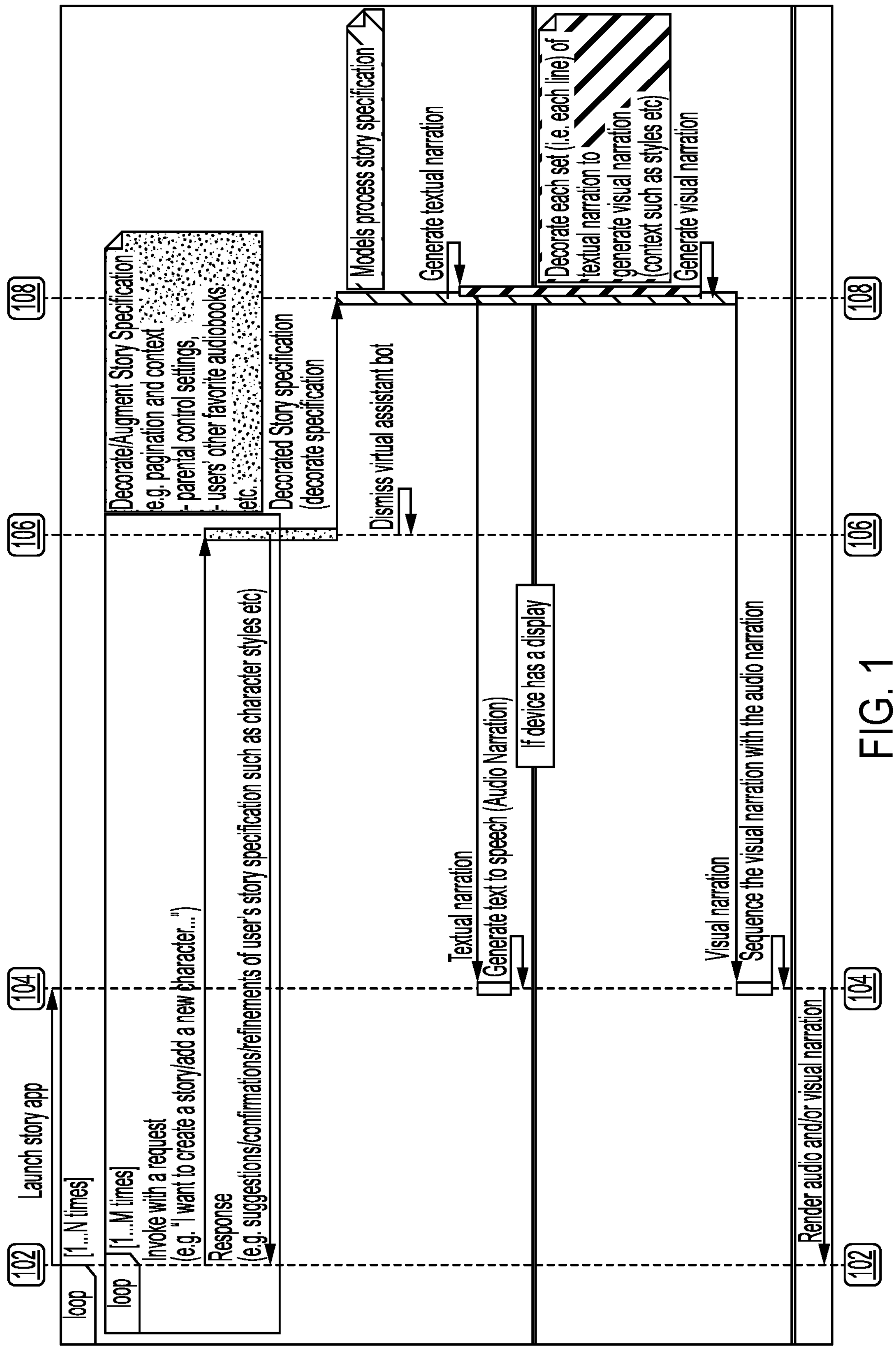
FIG. 1 illustrates a sequence diagram in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Literature is an artform constrained by technology. Plato famously disclosed his "unwritten doctrines" orally and without any written counterpart. These doctrines were shared sparingly with others as a result, with many questioning the accuracy like a game of "telephone" where words change after they are passed on from one person to another. Plato has had a profound impact on literature in modern society, but one has to wonder if his teachings could have been better implemented if shared more widely and with improved accuracy.

The invention of paper in 105 AD helped the dissemination of authored works to larger masses. The lightweight nature of paper allowed authors to quickly memorialize their thoughts and spread to a larger audience with relative ease. Literature benefited from this by allowing future authors to base their stories on those of earlier authors. Modern day plays derive much of their structure from the works of William Shakespeare, originally written on paper. Ernest Hemingway penned his stories on paper, distributed them widely, and now modern-day authors create written works with similar prose. The invention of paper therefore allowed greater advancement of literature by facilitating modern authors "building upon" the works of earlier authors.

The information age provided an exponential increase in the dissemination of written works. The invention of the internet allowed authors to write their works on keyboards (an invention itself) and spread those works with the click of a mouse. Some estimates claim 90% of the world's content was created in the last two years. Here, too, technology allowed authors to create a written work based on those of previous authors, but did so on a scale never seen before.

However, even today, the world's most creative subset of the population is still unable to create stories. Young children have famously imaginative minds. In fact, one popular children's book, "The Little Prince" by Antoine de Saint-Exupery, is based on the theme that a child is more creative and imaginative than an adult. Of course, the reason that children are unable to create stories is that only a prodigy 5-year-old would be able to write a few sentences, never mind a complete story. The present technology is able to close this gap by providing an easy-to-use user interface that can allow a user to create a story using artificial intelligence to provide the prose when the user provides a creative prompt on which to base the story.

Artificial intelligence has taken the creative world by storm and allowed the automatic generation of creative works based on existing data. For example, large language models (LLMs) receive textual user inputs and generate an output based on statistical patterns and relationships between words. While far from perfect, these large language models quickly generate content that is applicable to the user request. This content can then be published or otherwise shared in the same manner as pre-LLM writings and built upon by either humans or other LLMs.

Large language models conveniently produce and allow the publication of stories based on user prompts. However, these same LLMs fail to account for the individual circumstances of the user and how the output of the LLM can better represent the interests of the user. For example, assume a user requests the LLM to write a story about a famous musician. The user would likely prefer to read a story about Taylor Swift if the user was a seven year old girl, or conversely, would prefer to read about Tony Bennett if the user was an eighty year old man. A story would be more applicable to a resident of Phoenix, Arizona if it involved dry and hot weather; whereas a Seattle, Washington native may prefer the story include a chance of light rain showers.

The presently disclosed technology provides for generation of audio and/or visual storybooks based on user information identifying characteristics of the user and a prompt. To that end, systems, methods, and computer-readable media are provided for generating interactive content of audiobooks through a natural language interface. The disclosed technology generates a system prompt based on a combination of a user prompt and personal information of the user or of the user's environment. For example, the user can input a user prompt asking for the creation of a certain type of story, and the disclosed technology can obtain personal information such as the user's preferences or physical characteristics. That personal information can then be used to generate characteristics that the disclosed technology can then append or prepend to the user prompt. This combination can then be input into a multimodal machine learning model or multiple unimodal machine learning models to create both text and image outputs corresponding to the requested story line. The story can then be presented to the user and edited as needed, in some embodiments using the same technology as discussed above.

The present technology therefore allows users to create on-demand and personalized stories with a convenient user interface. The present technology also allows for more consistent content from page to page based on the user data provided to the system. This user data can create more consistent images and text styles that correspond to the characteristics of the user.

FIG. 1 illustrates a sequence diagram in accordance with some embodiments of the present technology. As shown, a user device 102 can include a story app 104 accessible by the user device 102. A virtual assistant bot 106 can be accessed by the user device 102 for reception of audio or textual input from the user. One or more content generation service(s) 108 can then generate an audiobook story based on the user prompt into the user device 102 via, e.g., the virtual assistant bot 106.

In some embodiments, the user device 102 can be a computing device (as described below with respect to FIG. 10), such as a smartphone, tablet, computer, smart watch, or any other device capable of receiving input. The story app 104 can be any application capable of implementing the disclosed methods. The virtual assistant bot 106 can be any application or system capable of receiving input and providing output, for example, Siri® by Apple®, Google Assistant®, Amazon Alexa®, or any similar application or system. The content generation service(s) 108 can be any content generation service, such as a large language model, or a visual content diffusion model such as a text-to-image model, or text-to-video model, or image/video-to-image/video model, for example.

As shown in FIG. 1, the user can enter a user specification (i.e., a user prompt) into the user device 102 to start the storybook creation process. For example, the user can enter a prompt "I want to create a story" or "I want to add a new character." In some embodiments, the user interface can include an interaction with a virtual assistant bot 106 that can be endowed with a skill that enables it to provide an interface between the user and a content generation service.

The virtual assistant bot 106 can be configured to assess the completeness or quality of a response. For example, the virtual assistant bot 106 can deem the prompt insufficiently detailed to generate a full story given the lack of information provided. The virtual assistant bot 106 can be sufficiently intelligent to make this determination on its own, or it can transmit the prompt to the content generation service 108 and receive a response from the content generation service 108 that the prompt does not provide enough information to generate a detailed storybook. In that case, the virtual assistant bot 106 can provide suggestions, confirmations, and refinements of the user's story specification (i.e., the user prompt) to gain additional detail about the character styles, story plot, or other helpful details.

The disclosed technology can also introduce personal information of the user to better decorate or augment the story specification. For example, the personal information can inform the disclosed technology regarding parental control settings or the users' other favorite audiobooks to provide context for the story. As one example, the personal information can be obtained from the user device 102 itself, or from a secure server associated with the user device 102, or from a wearable object of the user (e.g., an Apple Watch® or Fitbit®). In some embodiments, the personal information is obtained from the virtual assistant bot 106 itself. The virtual assistant bot 106 can then append or prepend the story specification before transmitting the story specification to one or more content generation services 108.

The content generation service 108 can either be a multimodal content generation service capable of generating text based on the input of text, and also capable of generating images or video based on the input of text. Alternatively, the content generation service 108 can be multiple unimodal or multimodal content generation services that collectively generate text and image and/or video based on a user specification requesting a particular type of story. As shown, the model(s) can process the story specification and generate a textual narrative that corresponds to the story. The story app 104 can then present the textual narration to the user in audio or written form.

In some embodiments, the user device 102 can include a display for displaying images or videos to the user based on the user specification requesting a story. Here, the content generation service(s) 108 can receive the user specification and output both textual narration and visual narration based on the user specification that is appended or prepended with user characteristics based on the personal information of the user. The textual and visual narration can be transmitted to the story app 104, sequenced for proper timing, and output to the user on the user device 102 via the story app 104. In some embodiments, the generated story can be output with any combination of written text, audio text or other sounds, or images and video corresponding to the text.

Figure 2:
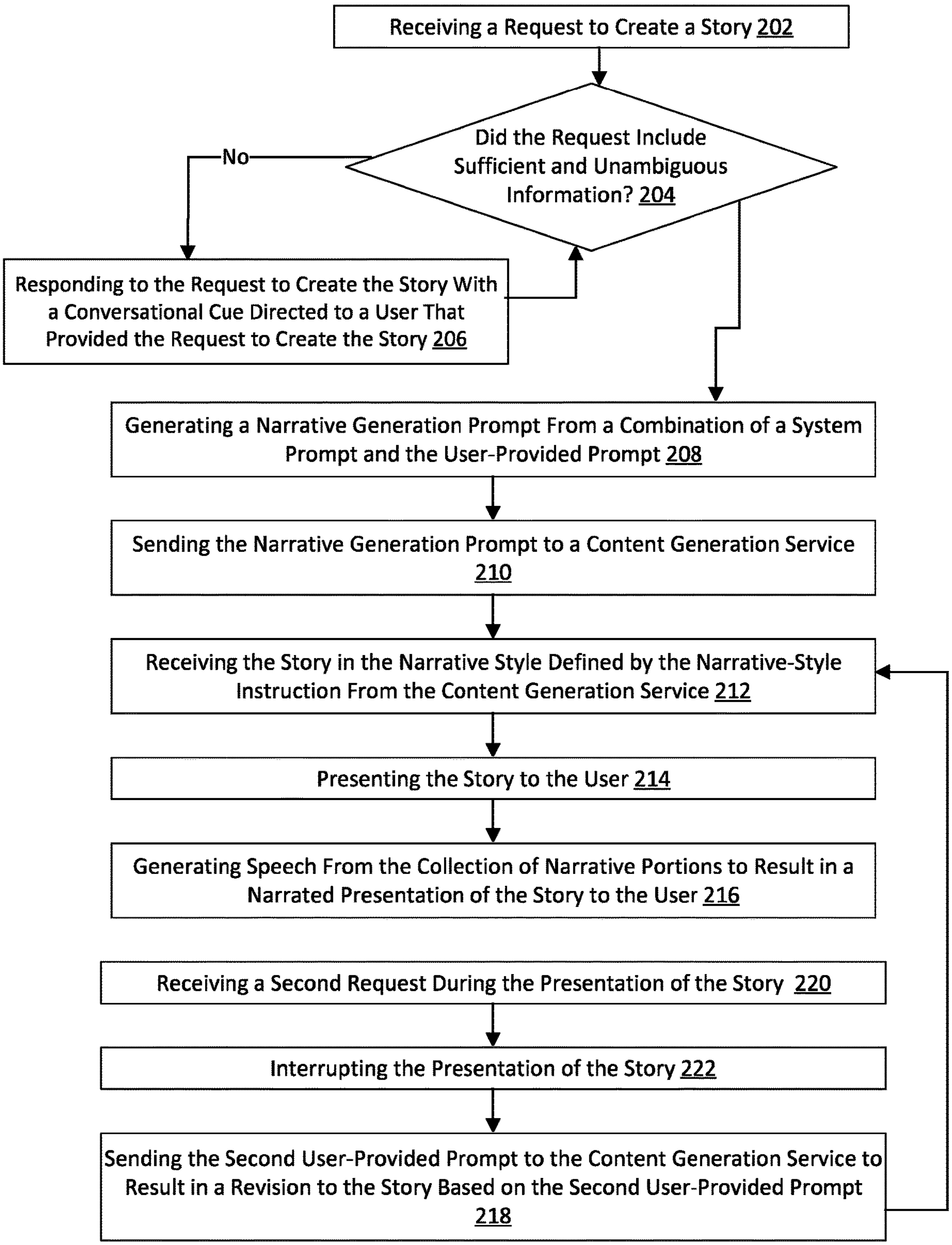
FIG. 2 illustrates an exemplary process for content creation in accordance with some embodiments of the present technology.

FIG. 2 illustrates an example method for generating a narrative from a user-provided prompt in accordance with some embodiments of the present technology. FIG. 2 addresses some aspects of the present technology that are also addressed in FIG. 1 but with additional detail. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As introduced above, one use case for the present technology is to allow children to provide prompts to generate stories. While this highly imaginative user subset is surprisingly adept at interacting with some devices, the interface and steps needed to create a story using the present technology needs to be simple and elegant. Many children who will benefit from the present technology might not be able to read or write yet.

Parents are also an important user subject. Although some young children might operate an iPad more effectively than, say, their grandparents, many children will need or want help, and many parents supervise their children's screen time. And although parents can read and write, parents too need a simple and elegant user experience. Even parents that value reading to their child occasionally experience harried moments when they need someone to read their child a story so the parents can keep the lights on or get food on the table. Accordingly, the present technology, addresses this need by providing an easy to use verbal interface to provide creative user prompts from which a story can be based.

According to some examples, the method includes receiving a request to create a story at block 202. For example, the virtual assistant bot 106 illustrated in FIG. 1 may receive a request to create a story. The request can be in the form of user speech or user text that is input into the virtual assistant bot 106. The request includes a user-provided prompt that includes a narrative seed from which to create the story. In this manner, the user can initiate the process of writing a story merely by pressing a button and speaking or writing the prompt into the virtual assistant bot 106 with ease. This improves the user experience by allowing the creation of a storybook with minimal effort.

According to some examples, the method includes determining whether the request includes sufficient and unambiguous information at decision block 204. For example, the virtual assistant bot 106 illustrated in FIG. 1 may determine whether the request includes sufficient and unambiguous information from which a story can be created. The virtual bot 106 can either make this determination itself, or transmit the user prompt to the content generation service 108 for determination of whether the user prompt contains sufficient information. Virtual assistant bot 106 can be trained to recognize prompts that might not reliably produce a good story.

For example, the virtual assistant bot 106 can determine that the user provided prompt is too general to provide a quality story. For example, the virtual assistant bot 106 can receive a prompt 'tell me a story' which does not provide any details regarding characters or plot. In another example, the virtual assistant bot can receive a prompt 'generate a story that takes my child to space,' and if that user account has more than one child, the this prompt might be ambiguous.

According to some examples, the method includes responding to the request to create the story with a conversational cue directed to the user that provided the request to create the story at block 206. For example, the virtual assistant bot 106 illustrated in FIG. 1 may respond to the request to create the story with a conversational cue directed to the user that provided the request to create the story. The conversational cue encourages the user to respond with additional details for inclusion in the narrative generation prompt. The additional details can include an age of a reader for which the story is intended, character refinements, plot refinements, style details, questions to alleviate an ambiguity, etc. Alternatively, or in addition to the above, the method may gather personal information from the user to determine the user's preferences, demographics, user characteristics, physical characteristics, or any other information about the user that would be beneficial in creating a story.

Even when the virtual assistant bot 106 has received a user-provided prompt with sufficient detail (whether from an initial prompt or after providing a conversational cue to encourage the user to provide additional detail), the user-provided prompt might still be lacking enough information to constrain content generation service 108 to provide a quality story. Users are not prompt engineers and shouldn't be expected to provide high quality prompts without assistance. For example, a good prompt to content generation service 108 might include information, about the length of the story, how the story should be formatted, what style of story should be created, and contextual information about the user that user-provided prompts don't generally include. Accordingly, the present technology compensates for this deficiency in user-provided prompts by including a system prompt generated by the virtual assistant bot 106.

According to some examples, the method includes generating a narrative generation prompt from a combination of a system prompt and the user-provided prompt at block 208. For example, the virtual assistant bot 106 illustrated in FIG. 1 may generate a narrative generation prompt from a combination of a system prompt and the user-provided prompt. The system prompt includes at least a narrative-style instruction and an output format instruction for a content generation service 108 to use as a prompt for a corresponding output of text for a story. The system prompt further includes audience contextual data for the story. The audience contextual data includes one or more of an age of a reader, environment data such as time of day and weather, mood data as derived from a biometric sensor, or any other personal information of the user.

The system prompt can originate in the form of a template that needs to be populated by the virtual assistant bot 106. In some embodiments, the system prompt might include variables to be filled in with information that can be used to personalize the story. The virtual assistant bot 106 executes on the client device, and might have privileged access to some personal information about the user. The virtual assistant bot 106 is trained to recognize which personal information can be provided, and which personal information should be abstracted. For example, the virtual assistant bot 106 might know the birthdate of the person the story is to be generated for, but the virtual assistant bot 106 might only request a story for a child that is 5-6 years old. The virtual assistant bot 106 might know the address of the user, or the current location of the user, but might abstract this information to request a story that takes place in the Midwest, or Kansas.

As described above, one aspect of the present technology is the gathering and use of data available from various sources to improve the generation of stories generated. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used create more personalized stories. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide mood-associated data. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Returning to FIG. 2, according to some examples, the method includes sending the narrative generation prompt to a content generation service at block 210. For example, the virtual assistant bot 106 illustrated in FIG. 1 may send the narrative generation prompt to a content generation service. The content generation service can be a generative large language model, or other service that is capable of generating textual context, image content, video content, audio content, or a combination thereof. The content generation service generates the text of the story based on the narrative generation prompt. The story is in a narrative style defined by the narrative-style instruction. The content generation service provides the story in an output format defined in the output format instruction.

According to some examples, the method includes receiving the story in the narrative style defined by the narrative-style instruction from the content generation service at block 212. For example, the story app 104 illustrated in FIG. 1 may receive the story in the narrative style defined by the narrative-style instruction from the content generation service. The content generation service provides the story in an output format defined in the output format instruction. The output format instruction defines a segmented format including a collection of narrative portions making up the story. For example, the output format designates certain sections as single "pages" of the story when viewed by the user.

According to some examples, the method includes presenting the story to the user at block 214. For example, the story app 104 illustrated in FIG. 1 may present the story to the user by displaying the text of the story to the user or (as described below with respect to FIG. 3) adding to the text or replacing the text with voice audio, and/or images, and/or video, that are synchronized with the text. The story is presented as a series of segments corresponding the collection of narrative portions. For example, the segments can be pages.

According to some examples, the method includes generating speech from the collection of narrative portions to result in a narrated presentation of the story to the user at block 216. For example, the story app 104 illustrated in FIG. 1 may generate speech from the collection of narrative portions to result in a narrated presentation of the story to the user.

In some embodiments, the virtual assistant bot 106 can receive information relating to the speech, including the words, pitch, demographic of the voice (e.g., gender or accent), tone, and other information, from the content generation service 108. The virtual assistant bot 106 can use this information to output speech as audio that corresponds to the style of the story, as determined by the information in the content generation prompt or information received from the content generation service 108.

According to some examples, the method includes receiving a second request during the presentation of the story at block 218. For example, the virtual assistant bot 106 illustrated in FIG. 1 may receive a second request during the presentation of the story. The second request can be to revise the story based on a second user-provided prompt.

According to some examples, the method includes interrupting the presentation of the story at block 220. For example, the virtual assistant bot 106 illustrated in FIG. 1 may interrupt the presentation of the story to allow for the processing of the second request through blocks 212-216. As one example, the user can interact with the virtual assistant bot 106 to provide input to add a different character, revise a character, or manipulate the storyline.

According to some examples, the method includes sending the second user-provided prompt to the content generation service to result in a revision to the story based on the second user-provided prompt at block 222. For example, the virtual assistant bot 106 illustrated in FIG. 1 may send the second user-provided prompt to the content generation service to result in a revision to the story based on the second user-provided prompt. The method will then revert to block 212 and run blocks 212-216 again to generate a story with text and voice audio, as described above in more detail. The user can then transmit a third request in block 218 and repeat the cycle until the story is to the user's satisfaction. Once the user is satisfied, the user can omit any subsequent requests in block 218 and the method can end.

Figure 3:
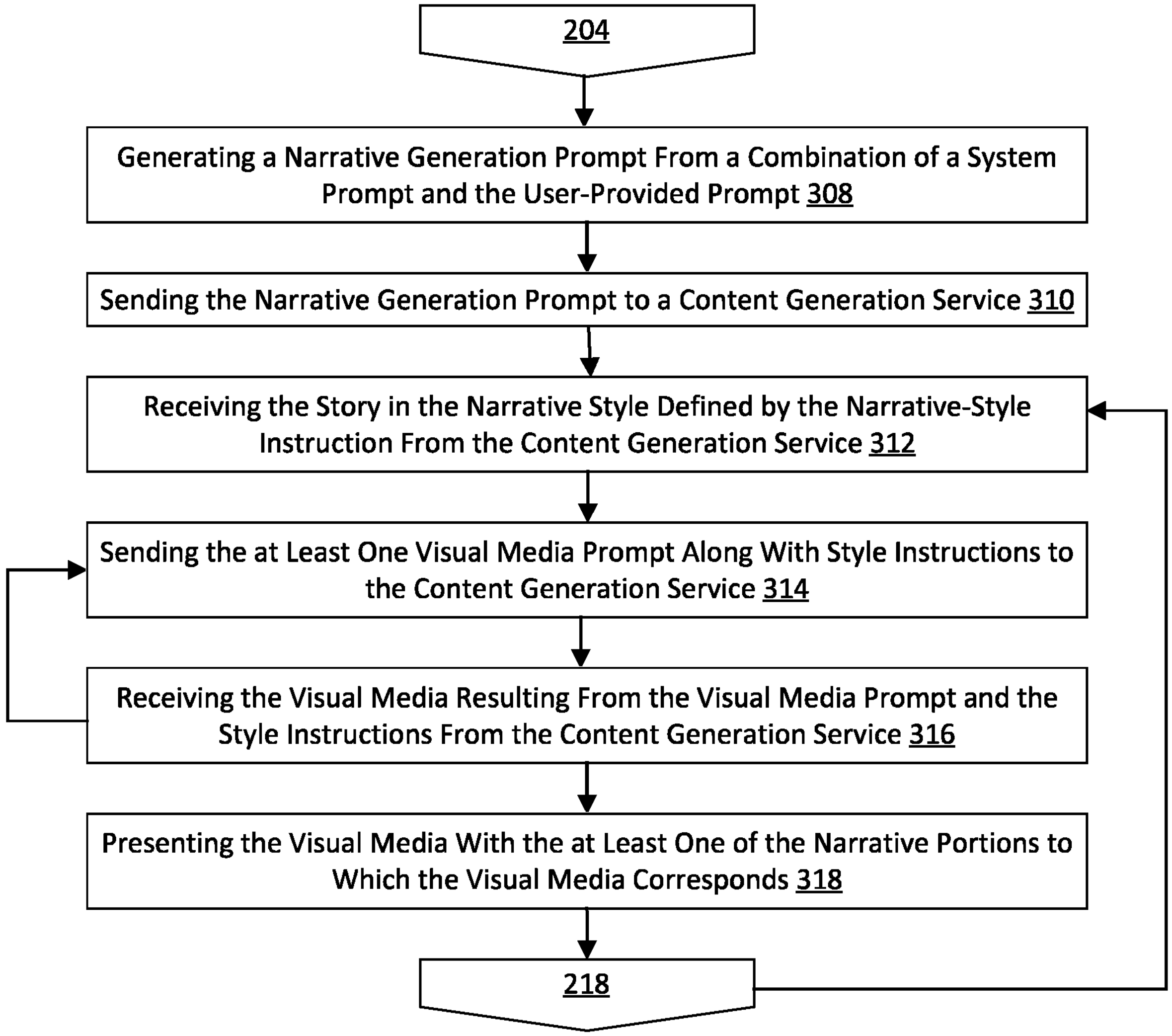
FIG. 3 illustrates another exemplary process for content creation in accordance with some embodiments of the present technology.

FIG. 3 illustrates an example method for generating a narrative with corresponding visuals from a user-provided prompt in accordance with some embodiments of the present technology. FIG. 3 addresses some aspects of the present technology that are also addressed in FIG. 1 but with additional detail. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

The method of FIG. 3 is similar to the method of FIG. 2 except that the method of FIG. 3 contemplates a more explicit request for and presentation of visuals. Accordingly, the method of FIG. 3 begins with the inital steps of FIG. 2.

While block 308 is substantially the same as block 208, addressed above, additional details are addressed with respect to block 308 as they pertain to the role of the system prompts in generating visuals to match the story. While FIG. 2 addresses an embodiment in which a text or narrated story is generated, FIG. 3 addresses an embodiment wherein visuals that correspond to the story can be displayed.

According to some examples, the method includes generating a narrative generation prompt from a combination of a system prompt and the user-provided prompt at block 308. For example, the virtual assistant bot 106 illustrated in FIG. 1 may generate a narrative generation prompt from a combination of a system prompt and the user-provided prompt.

As addressed above, users are not prompt engineers and shouldn't be expected to provide high quality prompts without assistance. This concept is even more true when the requested output is multi-modal. As addressed above, the system prompt includes at least a narrative-style instruction and an output format instruction for a large language model to use as a prompt for a corresponding output of text and visuals for a story. The system prompt further includes audience contextual data for the story. The audience contextual data includes one or more of an age of a reader, environment data such as time of day and weather, mood data as derived from a biometric sensor, or any other personal information of the user. The personal information can be provided by the virtual assistant bot 106 as discussed above, for example.

As addressed above the system prompt can originate in the form of a template that needs to be populated by the virtual assistant bot 106. In addition to the aspects that can be included in the system prompt addressed with respect to FIG. 2, the system prompt can also include instructions for the content generation service 108 to return visual media prompts which describe visuals that are coordinated with portions of the story that was also created by the content generation service 108. An example system prompt is as follows:

You are a children book writer. Write a children story with illustrated pictures for a 5 year-old boy \(storyline). Generate the narration scripts and illustration prompts in the RSA format. In the illustration prompts, don't use pronouns, don't use characters' names. Number narration scripts followed by illustration prompts.

Here is one example:

[Narration Script 0] Once upon a time.

[Illustration Prompt 0] A picture of a beautiful lake.

As seen in the example above, in addition to prompts required to cause the content generation service 108 to generate a good story for the audience member/user, the prompt also instructions the content generation service 108 to provide visual media prompts in a particular format. The format combined with the visual media prompts make it so the virtual assistant bot 106 can recognize pagination and can match the visual media prompts to the text of the same page.

Block 310 is substantially the same as block 210 addressed above expect that the narrative generation prompt also includes the instruction for the content generation service 108 to generate the visual media prompts as addressed with respect to block 308. According to some examples, the method includes sending the narrative generation prompt to a content generation service at block 210. For example, the virtual assistant bot 106 illustrated in FIG. 1 may send the narrative generation prompt to a content generation service. The content generation service can be a generative content generation service 108, or other service that is capable of generating textual context, image content, video content, audio content, or a combination thereof. The content generation service generates the text of the story based on the narrative generation prompt. The story is in a narrative style defined by the narrative-style instruction. The content generation service provides the story in an output format defined in the output format instruction. The output format instruction further defines at least one respective visual media prompt that corresponds with at least one narrative portion from the collection of narrative portions.

According to some examples, the method includes receiving the story in the narrative style defined by the narrative-style instruction from the content generation service at block 312. For example, the story app 104 illustrated in FIG. 1 may receive the story in the narrative style defined by the narrative-style instruction from the content generation service. The content generation service provides the story in an output format defined in the output format instruction. The output format instruction defines a segmented format including a collection of narrative portions making up the story. For example, the output format designates certain sections as single "pages" of the story when viewed by the user. Here is an example output from content generation service 108:

$ [Narration Script 1] Once upon a time, in a small forest, there lived a cute little rabbit. He was always hopping around, playing with his friends and exploring the woods.

$ [Visual media Prompt 1] Draw a picture of the rabbit hopping around in the forest.

$ [Narration Script 2] One sunny day, while the rabbit was playing, he heard a faint noise coming from a nearby bush. Curious, he hopped over to investigate.

$ [Visual media Prompt 2] A picture of the rabbit hopping towards the bush.

. . .

According to some examples, the method includes sending the at least one visual media prompt along with style instructions to the content generation service at block 314. For example, the virtual assistant bot 106 illustrated in FIG. 1 may send the at least one visual media prompt along with style instructions to the content generation service. The style instructions can include instructions configured to cause the content generation service to generate a plurality of respective instances of the visual media items that are in a consistent style. The style instructions can be sent with each visual media prompt. For example, style instructions can include the following terms for a children's storybook:

cute, children book, clearing, very detailed, realistic, figurative painter, fine art, oil painting on canvas|Draw a picture of the rabbit hopping around in the forest|

The visual media prompt and style instructions cause the instances of the visual media items to be befitting a collection of visual media items that should appear together in the same story, or to generate a video made up of a plurality of video frames that should appear together in the same video accompanying the story. In some embodiments, the user can also input an example digital art image with their user-provided prompt, or the virtual assistant bot 106 can provide the example digital art image, to assist the content generation service 108 in providing consistent and high-quality outputs of text, images, and video.

In some embodiments, the content generation service includes a narrative portion generation service and a visual media generation service. These services might be separate services that are reachable through the same application programming interface (API) or they might be separate services reachable via different APIs. For example, the content generation service may include or be operatively coupled to a multi-modal content generation service 108 that is capable of outputting both text and corresponding images or video. In such examples, the virtual assistant bot 106 calls (block 310) the API for the content generation service 108 to generate the narratives and the visual media prompt, and then the virtual assistant bot 106 calls (block 312) the API for the content generation service 108 again to generate the visual media.

In another example, the content generation service may include or be operatively coupled to multiple unimodal content generation services 108 that each provide the text, image, or video output. In this example, the virtual assistant bot 106 calls (block 310) a first API for the language content generation service 108 to generate the narratives and the visual media prompt, and then the virtual assistant bot 106 calls (block 314) a second API for the visual media content generation service 108 to generate the visual media.

In some examples, the content generation service is capable of multi-modal generation from the narrative generation prompt. In such examples, the content generation service 108 may be able to directly output the narrative and the visuals through a single API call. In such examples, the generating the narrative generation prompt at block 308 is adapted to instruct the model to provide the visual media in a format that the visual media can be matched to the narrative. In such examples, block 312 might not be needed and can be omitted.

According to some examples, the method includes receiving the visual media resulting from the visual media prompt and the style instructions from the content generation service at block 316. For example, the story app 104 illustrated in FIG. 1 may receive the visual media resulting from the visual media prompt and the style instructions from the content generation service. The visual media corresponding to the at least one of the narrative portions can be a plurality of visual media items. In some examples, the receiving the visual media can be an parallel process whereby virtual assistant bot 106 can make several requests for the visual media (block 314) and the story app 104 can receive visual media for a first page, and the second page, etc. Respective instances of the visual media items correspond to respective segments in the series of segments, e.g., the visual media items are illustrations that correspond to the narrative portion of the story presented on that page.

In some embodiments, the visual media corresponding to the at least one of the narrative portions is a video. The video is made up of a plurality of video frames that correspond to respective segments in the series of segments, e.g., frames within the video that correspond to the narrative portion are presented together. Here, the images/video and narrative text portions are synchronized based on data output from the content generation service 108. For example, the images/video and narrative text portions can be synchronized based on the paginations assigned to the respective sections of the images/video and text. When the visual media is video, all visual media prompts can be provided to the content generation service 108 at the same time. In some embodiments, the visual media prompts can be provided along with timestamps to indicate when the frames corresponding to the visual media prompts should be displayed. In some embodiments, the visual media prompts can be provided with a duration for the amount of time it will take the virtual assistant bot 106 to read all of the narrative portions to the user. The virtual assistant bot 106 can be responsible for determining the time stamps or the duration of the story.

According to some examples, the method includes presenting the visual media with the at least one of the narrative portions to which the visual media corresponds at block 318. For example, the story app 104 illustrated in FIG. 1 may present the visual media with the at least one of the narrative portions to which the visual media corresponds. Similar to that described with respect to block 216, the virtual assistant bot 106 can generate speech from the collection of narrative portions to result in a narrated presentation of the story.

Thereafter the method rejoins block 218 as addressed with respect to FIG. 2.

FIGS. 4-9 illustrate an example embodiment where a user requests and receives a storybook relating to a group of furry friends. The technology illustrated in FIGS. 4-9 allows easy creation of a storybook based on machine learning and personal information of the user. This allows not only the creation of new literature, but also the personalized touch of the author in the creation of the new literature. The personalized touch caused by the personal information allows a unique and consistent style to transcend the story.

Figure 4:
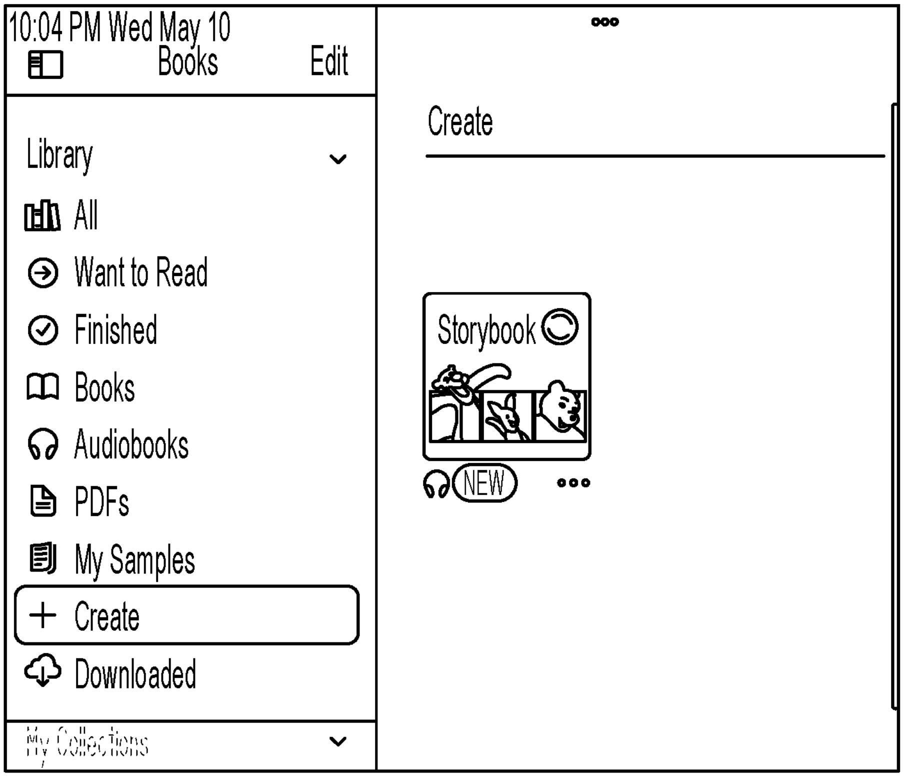
FIG. 4 illustrates an example user interface initiating a process for content creation in accordance with some embodiments of the present technology.

Consider the following example. A user may open their story app 104 on their user device 102. As shown in FIG. 4, this can include multiple tabs aligned on any portion of the display screen. One of the tabs can include an option for creating a new story. In this example, that tab is titled "Create" and includes all stories that have been created by the user already stored within.

Figure 5:
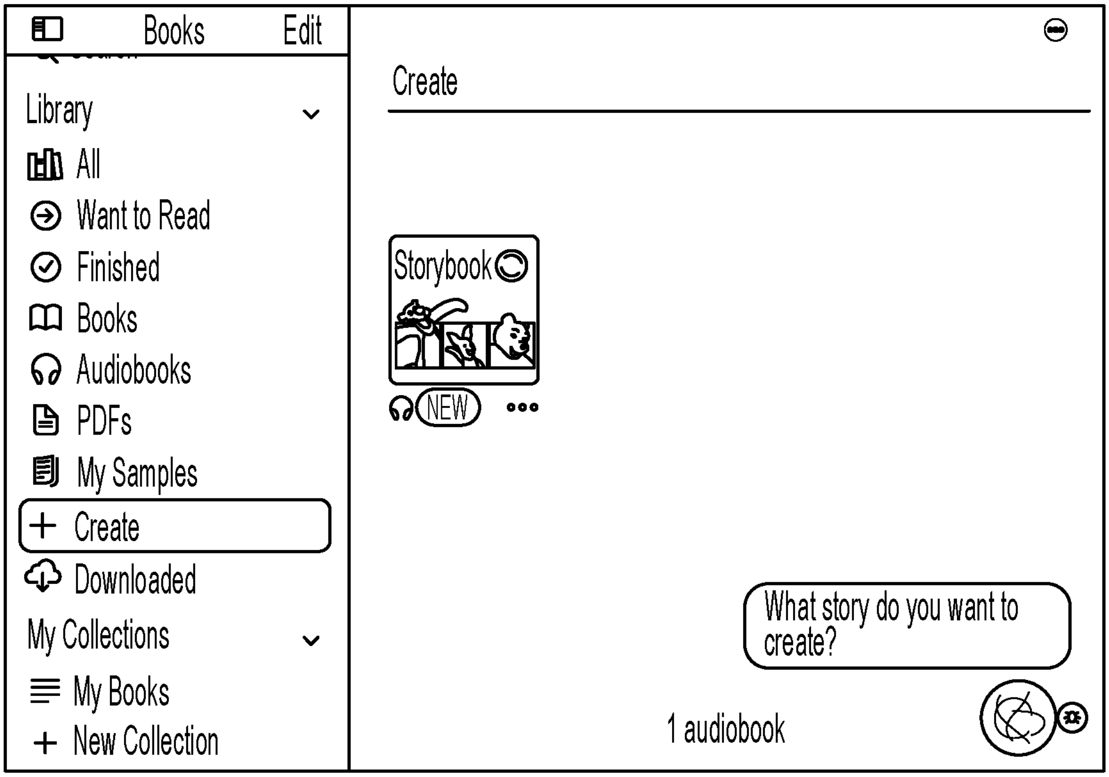
FIG. 5 illustrates an example user interface requesting a user prompt for content creation in accordance with some embodiments of the present technology.

FIG. 5 illustrates the story app 104 prompting the user for a user prompt to initiate the story creation process. Here, the story app 104, using the virtual assistant bot 106, prompts the user by speaking and displaying a text query that reads "What story do you want to create?"

Figure 6:
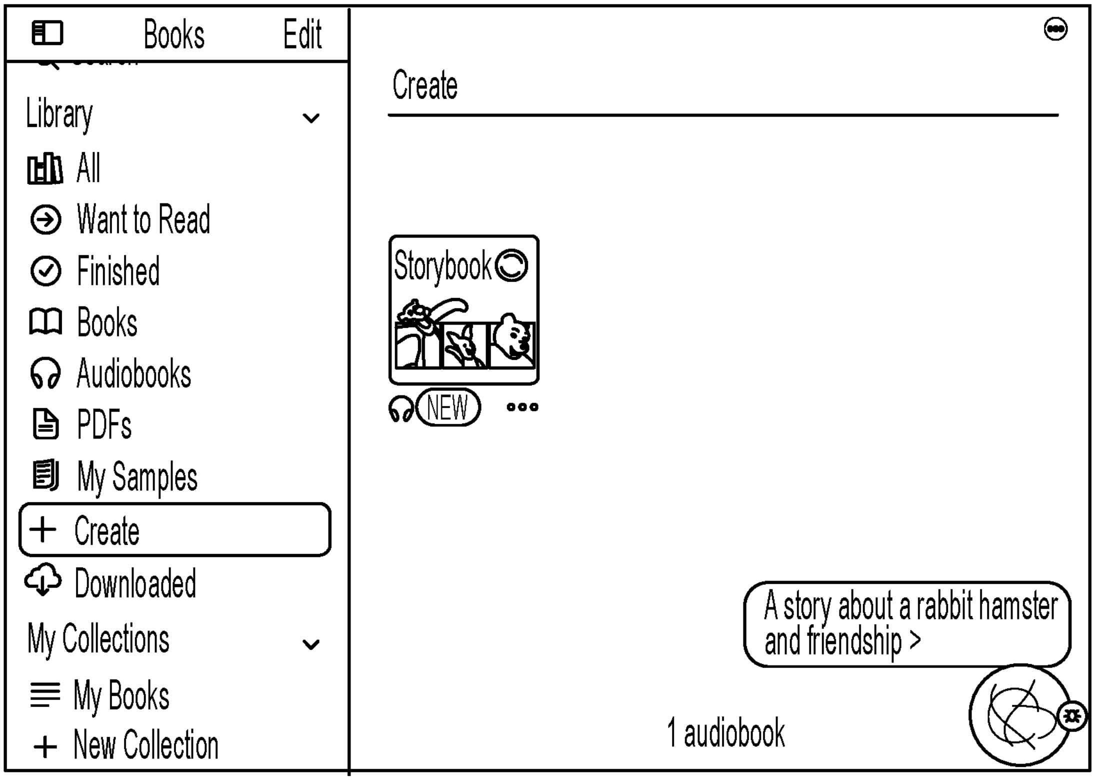
FIG. 6 illustrates an example user interface receiving a user prompt for content creation in accordance with some embodiments of the present technology.

As addressed with respect to block 202 in FIG. 2, and as illustrated in FIG. 6, the user responds to the text query and enters the following user prompt: "Create a story about a hamster, a rabbit and friendship." This user prompt can also be referred to herein as a "storyline." The user prompt can be either the user's voice, or a text entry, hand motions captured by video, or any other input that can cause a corresponding output of a system prompt, as discussed above. The disclosed methods can then retrieve personal information related to the user and append or prepend certain characteristics of that personal information to a system prompt that will then be transmitted to one or more text-to-text content generation service(s) 108. The user can also provide an example drawing to the content generation service 108 to help with the creation of similar drawings or style-specific narrative text.

As addressed with respect to block 208 in FIG. 2 and block 308 in FIG. 3, the virtual assistant bot 106 can then create one or more narrative generation prompts for the content generation service 108 to create the story. The virtual assistant bot 106 can present the user prompt along with the system prompt in the form of the narrative generation prompt. In this example, the virtual assistant bot 106 outputs You are a children book writer. Write a children story with illustrated pictures for a 5 year-old boy \ Create a story about a hamster, a rabbit and friendship. Generate the narration scripts and illustration prompts in the RSA format. In the illustration prompts, don't use pronouns, don't use characters' names. Number narration scripts followed by illustration prompts.

Here is one example:

[Narration Script 0] Once upon a time.

[Illustration Prompt 0] A picture of a beautiful lake.

As addressed with respect to block 210 in FIG. 2 and block 310 in FIG. 3, the above narrative generation prompt can then be input into text-to-text content generation service to generate the narrative text of the story. The narrative generation prompt can also cause the content generation service 108 to generate visual media prompts based on the narrative generation prompt. An example visual media prompt can be for example: "Draw a picture of the rabbit hopping around in the forest."

As addressed with respect to block 212 in FIG. 2 and block 312 in FIG. 3, the outputs from the text-to-text content generation service can include four main components. First, the output can include the text corresponding to the story. This text can be extracted by the story app 104 and use a text-to-speech engine (as might be provided by the virtual assistant bot 106) and converted into voice audio, in some embodiments. Second, the content generation service 108 can output the paginations for narration so that the images/video and text can be aligned. Third, the output can include a visual media prompt for the text-to-image content generation service. Fourth, the output can include the paginations for the responses from the text-to-image content generation service based on the previously mentioned visual media prompts. The paginations for the images can share the same paginations for narration to ensure alignment during presentation of the story.

As addressed with respect to block 314 in FIG. 3, the visual media prompts can be appended or prepended with styling instructions based on personal information of the user indicating the style of the story. In some embodiments, some personal information can be included in the style instructions so that the images or video generated can be representative of the user's personal style. The style-adjusted visual media prompt can then be sent to the text-to-image content generation service by the virtual assistant bot 106.

Figure 7:
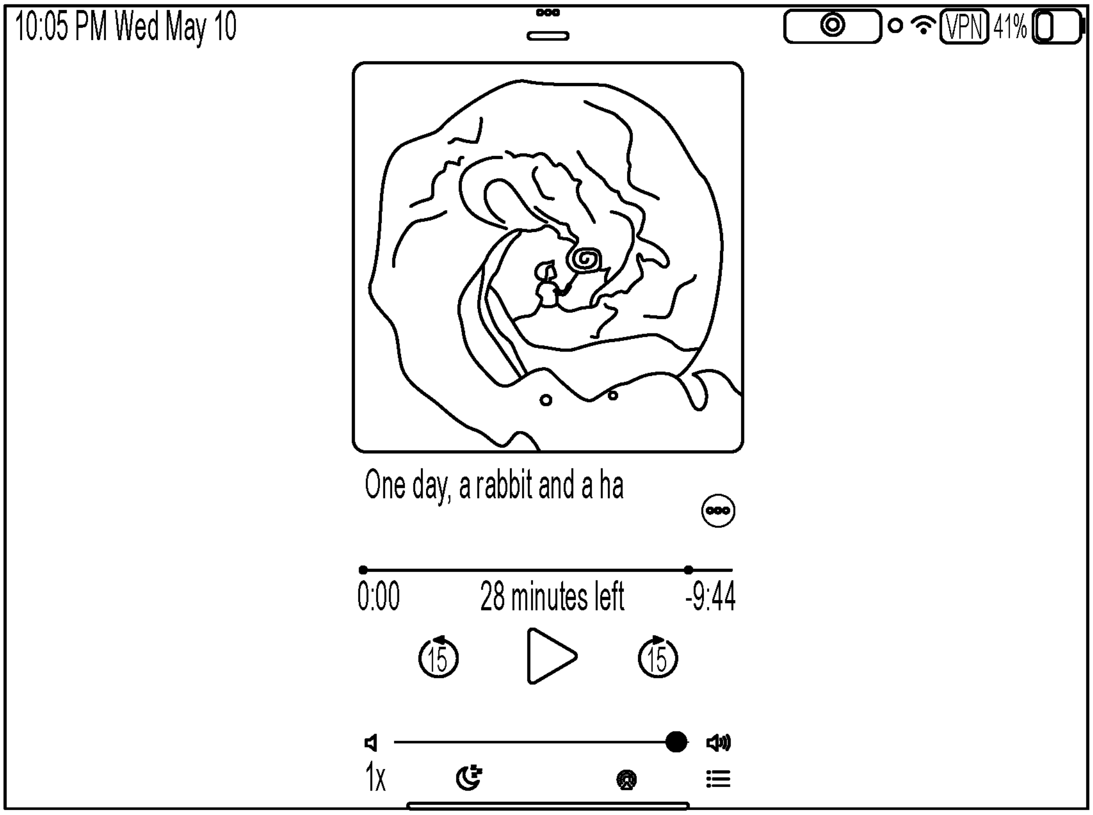
FIG. 7 illustrates an example user interface presenting the story to the user in accordance with some embodiments of the present technology.
Figure 8:
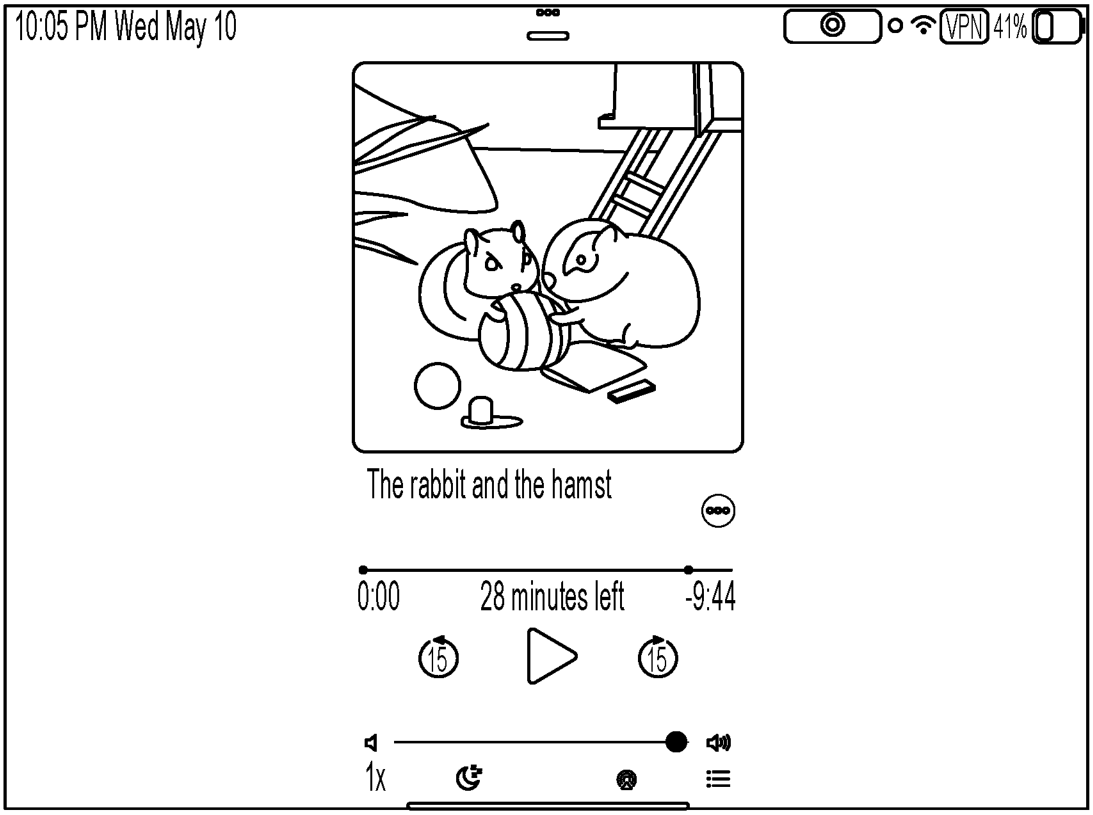
FIG. 8 illustrates an example user interface presenting a second page of the story to the user in accordance with some embodiments of the present technology.
Figure 9:
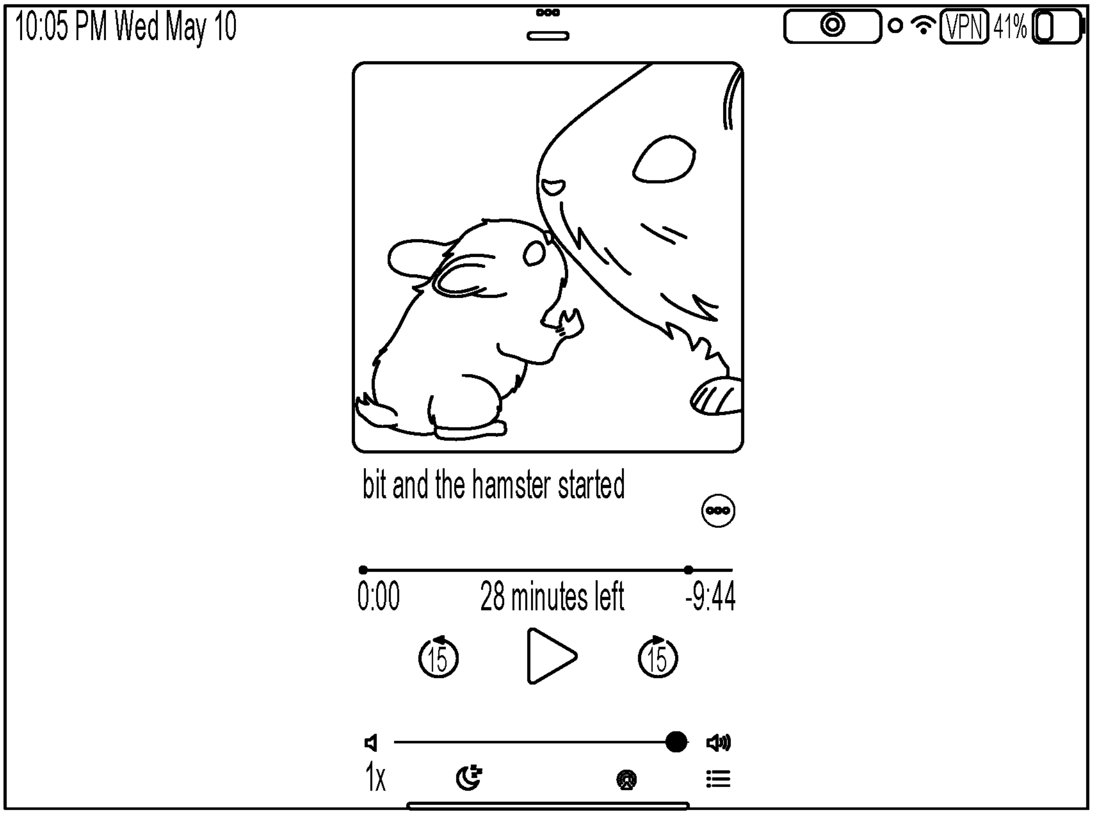
FIG. 9 illustrates an example user interface presenting a third page of the story to the user in accordance with some embodiments of the present technology.

Below is an example narration script alongside corresponding visual media prompts, according to one embodiment of the present technology. The corresponding story is shown in FIGS. 7-9, $ [Narration Script 1] Once upon a time, in a small forest, there lived a cute little rabbit. He was always hopping around, playing with his friends and exploring the woods.

$ [Visual media Prompt 1] Draw a picture of the rabbit hopping around in the forest.

$ [Narration Script 2] One sunny day, while the rabbit was playing, he heard a faint noise coming from a nearby bush. Curious, he hopped over to investigate.

$ [Visual media Prompt 2] A picture of the rabbit hopping towards the bush.

$ [Narration Script 3] As he peeked through the leaves, he saw a tiny hamster shivering in fear. The rabbit immediately understood that the hamster was lost and alone.

$ [Visual media Prompt 3] A picture of the hamster shivering in the bush, with the rabbit looking at him with concern.

$ [Narration Script 4] Without hesitation, the rabbit approached the hamster and asked if he needed any help. The hamster, feeling grateful, nodded his head eagerly.

$ [Visual media Prompt 4] A picture of the rabbit and hamster looking at each other, with the rabbit asking if the hamster needs help.

$ [Narration Script 5] The rabbit showed the hamster around the forest, introducing him to his friends and showing him all the fun places to play.

$ [Visual media Prompt 5] A picture of the rabbit showing the hamster around the forest, with other animals playing in the background.

$ [Narration Script 6] The hamster was amazed at how kind and friendly the rabbit and his friends were. He felt like he had found a new family.

$ [Visual media Prompt 6] A picture of the hamster smiling and laughing with the rabbit and his friends.

$ [Narration Script 7] From that day on, the rabbit and hamster became the best of friends, playing together every day and exploring the forest together.

$ [Visual media Prompt 7] A picture of the rabbit and hamster playing and exploring the forest together, with other animals joining in on the fun.

$ [Narration Script 8] The rabbit taught the hamster how to hop and play tag, while the hamster showed the rabbit how to climb trees and dig tunnels.

$ [Visual media Prompt 8] A picture of the rabbit and hamster teaching each other new things, with other animals watching and learning from them.

$ [Narration Script 9] Together, the rabbit and hamster learned that true friendship means helping and caring for each other, no matter how different they may seem.

$ [Visual media Prompt 9] A picture of the rabbit and hamster hugging, with other animals gathered around them, showing that friendship comes in all shapes and sizes.

$ [Narration Script 10] And so, the rabbit and hamster lived happily ever after, always together and always friends.

$ [Visual media Prompt 10] A picture of the rabbit and hamster sitting together, watching the sunset, with other animals gathered around them, showing that true friendship lasts forever.

As shown in FIGS. 4-9, the disclosed methods allow a user to quickly generate a high quality story with corresponding audio and images, or even video, if desired. As addressed herein, the creation of a high quality story with consistent visual media is not as simple as providing a user provided prompt to a content generation service. Rather, the present technology combines the user provided prompt with engineered system prompts to cause the content generation service to provide the necessary outputs. In some embodiments, the user's personal information can be used by the virtual assistant bot to add additional personalization to the narrative and visual media.

The above examples contemplate a single user story creation process, but the present technology is not so limited. For example, multiple users can have user profiles where multiple user personal information contributes to the story (e.g., the personal information of a family).

While the figures show a single user story creation process, this can be naturally extended to a multiple user story creation process. The multiple user story creation process also allows addition of information from multiple individual profiles (for instance, HomePod allows multiple user profiles) to be mixed into the story and this produces a collaborative experience.

Figure 10:
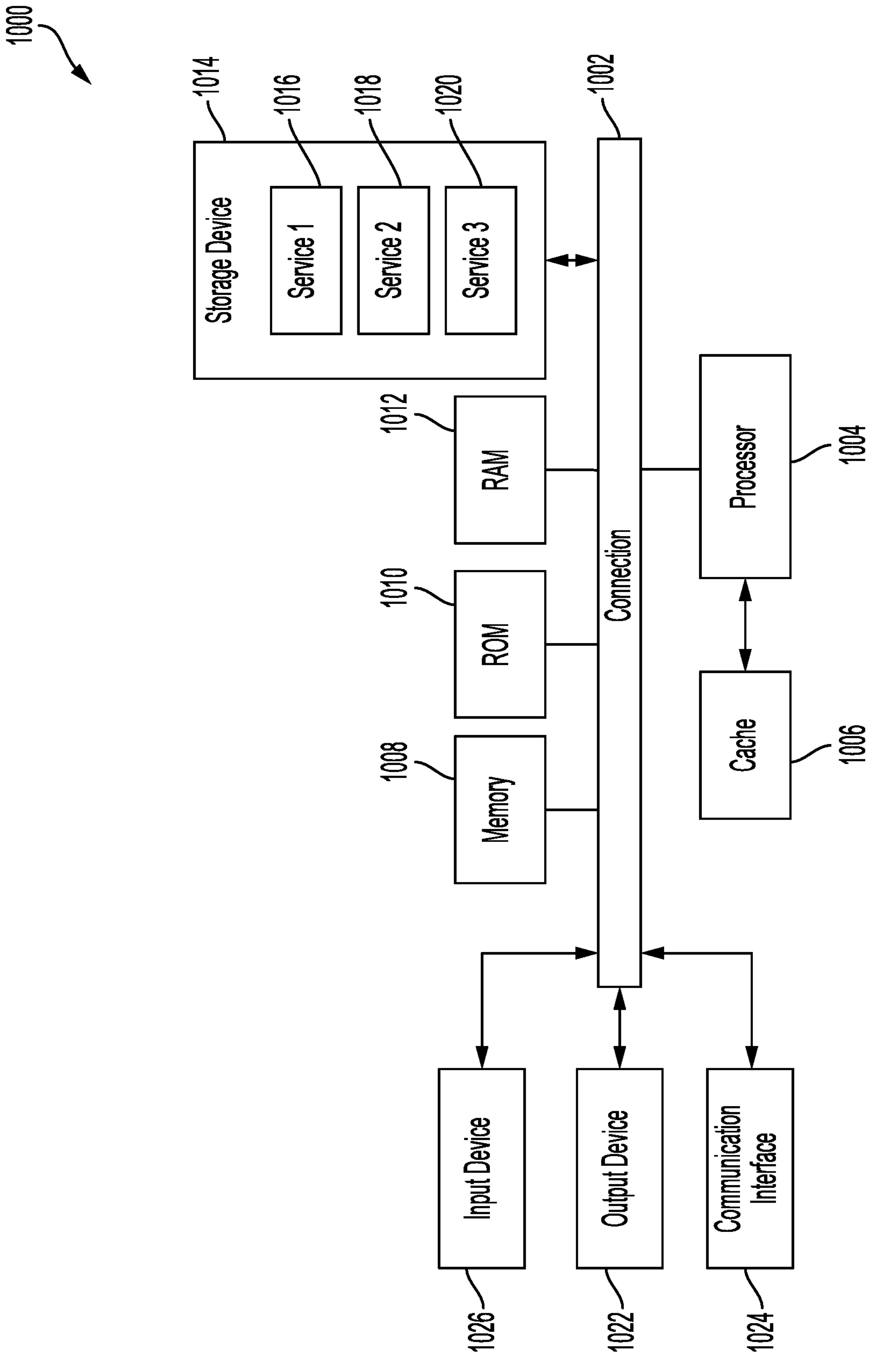
FIG. 10 shows an example of a computing system for implementing certain aspects of the present technology.

FIG. 10 shows an example of computing system 1000, which can be for example any computing device making up the user device 102 or any component thereof in which the components of the system are in communication with each other using connection 1002. Connection 1002 can be a physical connection via a bus, or a direct connection into processor 1004, such as in a chipset architecture. Connection 1002 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1000 includes at least one processing unit (CPU or processor) 1004 and connection 1002 that couples various system components including system memory 1008, such as read-only memory (ROM) 1010 and random access memory (RAM) 1012 to processor 1004. Computing system 1000 can include a cache of high-speed memory 1006 connected directly with, in close proximity to, or integrated as part of processor 1004.

Processor 1004 can include any general purpose processor and a hardware service or software service, such as services 1016, 1018, and 1020 stored in storage device 1014, configured to control processor 1004 as well as a special-purpose processor where software instructions are incorporated into the actual processor design. Processor 1004 may essentially be a completely self-contained computing system, containing multiple cores or processors, a bus, memory controller, cache, etc. A multi-core processor may be symmetric or asymmetric.

To enable user interaction, computing system 1000 includes an input device 1026, which can represent any number of input mechanisms, such as a microphone for speech, a touch-sensitive screen for gesture or graphical input, keyboard, mouse, motion input, speech, etc. Computing system 1000 can also include output device 1022, which can be one or more of a number of output mechanisms known to those of skill in the art. In some instances, multimodal systems can enable a user to provide multiple types of input/output to communicate with computing system 1000. Computing system 1000 can include communication interface 1024, which can generally govern and manage the user input and system output. There is no restriction on operating on any particular hardware arrangement, and therefore the basic features here may easily be substituted for improved hardware or firmware arrangements as they are developed.

Storage device 1014 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1014 can include software services, servers, services, etc., that when the code that defines such software is executed by the processor 1004, it causes the system to perform a function. In some embodiments, a hardware service that performs a particular function can include the software component stored in a computer-readable medium in connection with the necessary hardware components, such as processor 1004, connection 1002, output device 1022, etc., to carry out the function.

For clarity of explanation, in some instances, the present technology may be presented as including individual functional blocks including functional blocks comprising devices, device components, steps or methods in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

As described above, one aspect of the present technology is the gathering and use of data available from various sources to improve the creation of content that may be of interest to the user(s). As used herein, the term "personal information" and its functional equivalents is not limited to the legal definition of "personally identifiable information" (what is commonly referred to as "PII"). Rather, this term can include any information relating to the characteristics of the user or of those associated with the user, and that is provided to the present technology through any means. For example, as used herein, personal information can include, but is not limited to, identity information (for example, the user's name, address, date of birth, phone number, email address, social media handle, user name, password, social security number, passport number, driver's license number, government identification number), geolocational data (for example, the user's current or past location, GPS data, IP addresses, or other location tracking information), financial information (for example, bank account number, credit card number, financial transaction history, income or other financial details), personal characteristics (for example, occupation, age, height, weight, preferences, website browsing history, ethnic origin, genetic data, sex, preferred gender, sexual orientation), biometric information (for example, fingerprint, facial recognition, retina scan, voiceprint) and health information (for example, heart rate, blood pressure, blood type, blood oxygen level, disease-related information, medical conditions, prescriptions, medication taken on a regular basis, medical history, insurance information, fitness data, or any other information that would be requested by and/or provided to a medical professional).

The present disclosure recognizes that the use of such personal information data, in the present technology, can be used to the benefit of users. For example, the personal information data can be used to provide user-specific content that is of greater interest to the user. Accordingly, use of such personal information data enables users to control the delivery and quality of the content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The present technology includes computer-readable storage mediums for storing instructions, and systems for executing any one of the methods embodied in the instructions addressed in the aspects of the present technology presented below:

Aspect 1. A method for generating a narrative with corresponding visuals from a user prompt, the method comprising: receiving, by a virtual assistant bot, a request to create a story, wherein the request includes a user-provided prompt that includes a narrative seed from which to create the story; generating, by the virtual assistant bot, a narrative generation prompt from a combination of a system prompt and the user-provided prompt; sending, by the virtual assistant bot, the narrative generation prompt to a generative content generation service, wherein the content generation service generates narrative text corresponding to the story based on the narrative generation prompt, and further generates visual media prompts corresponding to the narrative text; generating, by the content generation service, visuals in response to the visual media prompts; receiving, by a story application and from the content generation service, the narrative text and the visuals in the style defined by the narrative generation prompt; synchronizing, by the story application, the visuals with the narrative text to create the story; and presenting, by the story application, the story to the user, wherein the story is presented as a series of segments.

Aspect 2: The method of Aspect 1, wherein the presenting the story to the user comprises: generating, by a text to speech engine of the story application, voice audio corresponding to the narrative text to result in a narrated presentation of the story to the user.

Aspect 3: The method of Aspects 1 or 2, wherein the system prompt includes characteristics derived from personal information of the user to establish a style for the story.

Aspect 4: The method of any of Aspects 1 to 3, wherein the content generation service is a multi-modal content generation service capable of generating at least two or more of text, images, and video.

Aspect 5: The method of any of Aspects 1 to 4, wherein the system prompt includes an output format instruction; and the content generation service provides the story in an output format defined in the output format instruction.

Aspect 6: The method of any of Aspects 1 to 5, further comprising: prior to generating the narrative generation prompt, responding to the request to create the story with a conversational cue directed to a user that provided the request to create the story, wherein the conversational cue encourages the user to respond with additional details for inclusion in the narrative generation prompt.

Aspect 7: The method of any of Aspects 1 to 6, further comprising: receiving, by the virtual assistant bot during the presentation of the story, a second request, the second request being a request to revise the story based on a second user-provided prompt; interrupting the presentation of the story; and sending the second user-provided prompt to the content generation service to result in a revision to the story based on the second user-provided prompt.

Aspect 8: A system for generating a narrative with corresponding visuals from a user prompt, the system comprising: one or more processors; and at least one computer-readable storage medium having stored therein instructions which, when executed by the one or more processors, cause the one or more processors to perform operations comprising: receiving, by a virtual assistant bot, a request to create a story, wherein the request includes a user-provided prompt that includes a narrative seed from which to create the story; generating, by the virtual assistant bot, a narrative generation prompt from a combination of a system prompt and the user-provided prompt; sending, by the virtual assistant bot, the narrative generation prompt to a generative content generation service, wherein the content generation service generates narrative text corresponding to the story based on the narrative generation prompt, and further generates visual media prompts corresponding to the narrative text; generating, by the content generation service, visuals in response to the visual media prompts; receiving, by a story application and from the content generation service, the narrative text and the visuals in the style defined by the narrative generation prompt; synchronizing, by the story application, the visuals with the narrative text to create the story; and presenting, by the story application, the story to the user, wherein the story is presented as a series of segments.

Aspect 9: The system of Aspect 8, wherein the presenting the story to the user comprises: generating, by a text to speech engine of the story application, voice audio corresponding to the narrative text to result in a narrated presentation of the story to the user.

Aspect 10: The system of Aspects 8 or 9, wherein the system prompt includes characteristics derived from personal information of the user to establish a style for the story.

Aspect 11: The system of any of Aspects 8 to 10, wherein the content generation service is a multi-modal content generation service capable of generating at least two or more of text, images, and video.

Aspect 12: The system of any of Aspects 8 to 11, wherein the system prompt includes an output format instruction; and the content generation service provides the story in an output format defined in the output format instruction.

Aspect 13: The system of any of Aspects 8 to 12, further comprising: prior to generating the narrative generation prompt, responding to the request to create the story with a conversational cue directed to a user that provided the request to create the story, wherein the conversational cue encourages the user to respond with additional details for inclusion in the narrative generation prompt.

Aspect 14: The system of any of Aspects 8 to 13, further comprising: receiving, by the virtual assistant bot during the presentation of the story, a second request, the second request being a request to revise the story based on a second user-provided prompt; interrupting the presentation of the story; and sending the second user-provided prompt to the content generation service to result in a revision to the story based on the second user-provided prompt.

Aspect 15: A non-transitory computer-readable storage medium having stored therein instructions which, when executed by one or more processors, cause the one or more processors to perform operations comprising: receiving, by a virtual assistant bot, a request to create a story from a user, wherein the request includes a user-provided prompt that includes a narrative seed from which to create the story; generating, by the virtual assistant bot, a narrative generation prompt from a combination of a system prompt and the user-provided prompt; sending, by the virtual assistant bot, the narrative generation prompt to a generative content generation service, wherein the content generation service generates narrative text corresponding to the story based on the narrative generation prompt, and further generates visual media prompts corresponding to the narrative text; generating, by the content generation service, visuals in response to the visual media prompts; receiving, by a story application and from the content generation service, the narrative text and the visuals in the style defined by the narrative generation prompt; synchronizing, by the story application, the visuals with the narrative text to create the story; and presenting, by the story application, the story to the user, wherein the story is presented as a series of segments.

Aspect 16: The non-transitory computer-readable storage medium of Aspect 15, wherein the presenting the story to the user comprises: generating, by a text to speech engine of the story application, voice audio corresponding to the narrative text to result in a narrated presentation of the story to the user.

Aspect 17: The non-transitory computer-readable storage medium of Aspect 15 or 16, wherein the system prompt includes characteristics derived from personal information of the user to establish a style for the story.

Aspect 18: The non-transitory computer-readable storage medium of any of Aspects 15 to 17, wherein the content generation service is a multi-modal content generation service capable of generating at least two or more of text, images, and video.

Aspect 19: The non-transitory computer-readable storage medium of any of Aspects 15 to 18, wherein the system prompt includes an output format instruction; and the content generation service provides the story in an output format defined in the output format instruction.

Aspect 20: The non-transitory computer-readable storage medium of any of Aspects 15 to 19, wherein the operations further comprise: prior to generating the narrative generation prompt, responding to the request to create the story with a conversational cue directed to a user that provided the request to create the story, wherein the conversational cuc encourages the user to respond with additional details for inclusion in the narrative generation prompt.

What is claimed is:

1. A method for generating a narrative with corresponding visuals from a user prompt, the method comprising:

receiving, by a virtual assistant bot, a request to create a story, wherein the request to create the story includes a user-provided prompt that includes a narrative seed from which to create the story;

generating, by the virtual assistant bot, a narrative generation prompt from a combination of a system prompt and the user-provided prompt;

sending, by the virtual assistant bot, the narrative generation prompt to a generative content generation service, wherein the generative content generation service generates narrative text corresponding to the story based on the narrative generation prompt, wherein the generative content generation service further generates visual media prompts corresponding to the narrative text, and wherein the visual media prompts include text that represents instructions to generate visuals;

generating, by the generative content generation service, the visuals in response to the visual media prompts;

receiving, by a story application and from the generative content generation service, the narrative text and the visuals in a style defined by the narrative generation prompt;

synchronizing, by the story application, the visuals with the narrative text to create the story; and presenting, by the story application, the story to a user, wherein the story is presented as a series of segments.

2. The method of claim 1, wherein presenting the story to the user comprises:

generating, by a text to speech engine of the story application, voice audio corresponding to the narrative text to result in a narrated presentation of the story to the user.

3. The method of claim 1, wherein the system prompt includes characteristics derived from personal information of the user to establish a style for the story.

4. The method of claim 1, wherein the generative content generation service is a multi-modal generative content generation service capable of generating at least two or more of text, images, and video.

5. The method of claim 1, wherein the system prompt includes an output format instruction; and wherein the generative content generation service provides the story in an output format defined in the output format instruction.

6. The method of claim 1, further comprising:

prior to generating the narrative generation prompt, responding to the request to create the story with a conversational cue directed to a respective user that provided the request to create the story, wherein the conversational cue encourages the respective user to respond with additional details for inclusion in the narrative generation prompt.

7. The method of claim 1, further comprising:

receiving, by the virtual assistant bot during presentation of the story, a second request, the second request being a request to revise the story based on a second user-provided prompt;

interrupting the presentation of the story; and sending the second user-provided prompt to the generative content generation service to result in a revision to the story based on the second user-provided prompt.

8. A system for generating a narrative with corresponding visuals from a user prompt, the system comprising:

one or more processors; and at least one computer-readable storage medium having stored therein instructions which, when executed by the one or more processors, cause the one or more processors to perform operations comprising:

receiving, by a virtual assistant bot, a request to create a story, wherein the request to create the story includes a user-provided prompt that includes a narrative seed from which to create the story;

generating, by the virtual assistant bot, a narrative generation prompt from a combination of a system prompt and the user-provided prompt;

sending, by the virtual assistant bot, the narrative generation prompt to a generative content generation service, wherein the generative content generation service generates narrative text corresponding to the story based on the narrative generation prompt, wherein the generative content generation service further generates visual media prompts corresponding to the narrative text, and wherein the visual media prompts include text that represents instructions to generate visuals;

generating, by the generative content generation service, the visuals in response to the visual media prompts;

receiving, by a story application and from the generative content generation service, the narrative text and the visuals in a style defined by the narrative generation prompt;

synchronizing, by the story application, the visuals with the narrative text to create the story; and presenting, by the story application, the story to a user, wherein the story is presented as a series of segments.

9. The system of claim 8, wherein presenting the story to the user comprises:

generating, by a text to speech engine of the story application, voice audio corresponding to the narrative text to result in a narrated presentation of the story to the user.

10. The system of claim 8, wherein the system prompt includes characteristics derived from personal information of the user to establish a style for the story.

11. The system of claim 8, wherein the generative content generation service is a multi-modal generative content generation service capable of generating at least two or more of text, images, and video.

12. The system of claim 8, wherein the system prompt includes an output format instruction; and wherein the generative content generation service provides the story in an output format defined in the output format instruction.

13. The system of claim 8, further comprising:

prior to generating the narrative generation prompt, responding to the request to create the story with a conversational cue directed to a respective user that provided the request to create the story, wherein the conversational cue encourages the respective user to respond with additional details for inclusion in the narrative generation prompt.

14. The system of claim 8, further comprising:

receiving, by the virtual assistant bot during presentation of the story, a second request, the second request being a request to revise the story based on a second user-provided prompt;

interrupting the presentation of the story; and sending the second user-provided prompt to the generative content generation service to result in a revision to the story based on the second user-provided prompt.

15. A non-transitory computer-readable storage medium having stored therein instructions which, when executed by one or more processors, cause the one or more processors to perform operations comprising:

receiving, by a virtual assistant bot, a request to create a story from a user, wherein the request to create the story includes a user-provided prompt that includes a narrative seed from which to create the story;

generating, by the virtual assistant bot, a narrative generation prompt from a combination of a system prompt and the user-provided prompt;

sending, by the virtual assistant bot, the narrative generation prompt to a generative content generation service, wherein the generative content generation service generates narrative text corresponding to the story based on the narrative generation prompt, wherein the generative content generation service further generates visual media prompts corresponding to the narrative text, and wherein the visual media prompts include text that represents instructions to generate visuals;

generating, by the generative content generation service, the visuals in response to the visual media prompts;

receiving, by a story application and from the generative content generation service, the narrative text and the visuals in a style defined by the narrative generation prompt;

synchronizing, by the story application, the visuals with the narrative text to create the story; and presenting, by the story application, the story to a user, wherein the story is presented as a series of segments.

16. The non-transitory computer-readable storage medium of claim 15, wherein presenting the story to the user comprises:

generating, by a text to speech engine of the story application, voice audio corresponding to the narrative text to result in a narrated presentation of the story to the user.

17. The non-transitory computer-readable storage medium of claim 15, wherein the system prompt includes characteristics derived from personal information of the user to establish a style for the story.

18. The non-transitory computer-readable storage medium of claim 15, wherein the generative content generation service is a multi-modal generative content generation service capable of generating at least two or more of text, images, and video.

19. The non-transitory computer-readable storage medium of claim 15, wherein the system prompt includes an output format instruction; and wherein the generative content generation service provides the story in an output format defined in the output format instruction.

20. The non-transitory computer-readable storage medium of claim 15, wherein the operations further comprise:

prior to generating the narrative generation prompt, responding to the request to create the story with a conversational cue directed to a respective user that provided the request to create the story, wherein the conversational cue encourages the respective user to respond with additional details for inclusion in the narrative generation prompt.

21. The non-transitory computer-readable storage medium of claim 15, wherein the operations further comprise:

receiving, by the virtual assistant bot during presentation of the story, a second request, the second request being a request to revise the story based on a second user-provided prompt;

interrupting the presentation of the story; and sending the second user-provided prompt to the generative content generation service to result in a revision to the story based on the second user-provided prompt.

* * * * *